United States Patent [19]

Itoh et al.

[11] Patent Number: 5,664,220
[45] Date of Patent: Sep. 2, 1997

[54] INFORMATION TRANSMISSION/RECEPTION SYSTEM FOR TRANSMITTING INFORMATION TO REQUESTERS, WHERE IT IS RECORDED, IN RESPONSE TO A PLURALITY OF REQUESTS

[75] Inventors: Shigeyuki Itoh, Kawasaki; Iwao Aizawa, Yokohama, both of Japan

[73] Assignee: Hitachi, Ltd., Tokyo, Japan

[21] Appl. No.: 297,492

[22] Filed: Aug. 29, 1994

[30] Foreign Application Priority Data

Aug. 31, 1993  [JP]  Japan ................... 5-215914

[51] Int. Cl.⁶ ........................................... G06F 13/00
[52] U.S. Cl. ........................ 395/826; 395/840; 395/841; 395/850
[58] Field of Search ............................ 395/826, 840, 395/841, 844, 200, 800, 850

[56] References Cited

U.S. PATENT DOCUMENTS

| | | | |
|---|---|---|---|
| 3,728,682 | 4/1973 | Helbig, Sr. | 395/844 |
| 4,550,386 | 10/1985 | Hirosawa et al. | 395/166 |
| 4,658,350 | 4/1987 | Eggebrecht et al. | 395/846 |
| 4,839,799 | 6/1989 | Takahashi et al. | 395/250 |
| 4,841,475 | 6/1989 | Ishizuka | 395/849 |
| 4,901,232 | 2/1990 | Harrington et al. | 395/826 |
| 5,008,808 | 4/1991 | Fries et al. | 395/826 |
| 5,016,160 | 5/1991 | Lambeth et al. | 395/844 |
| 5,134,698 | 7/1992 | Imamura et al. | 395/846 |
| 5,182,800 | 1/1993 | Farrell et al. | 395/844 |
| 5,220,653 | 6/1993 | Miro | 395/826 |
| 5,341,473 | 8/1994 | Takayama | 395/200.08 |
| 5,367,639 | 11/1994 | Sodos | 395/844 |
| 5,392,443 | 2/1995 | Sakakibara et al. | 395/800 |
| 5,432,912 | 7/1995 | Kihara | 395/850 |
| 5,448,702 | 9/1995 | Garcia, Jr. et al. | 395/844 |

FOREIGN PATENT DOCUMENTS

| | | |
|---|---|---|
| 60-204143 | 10/1985 | Japan . |
| 61-260784 | 11/1986 | Japan . |
| 62-188579 | 8/1987 | Japan . |
| 1-32545 | 2/1989 | Japan . |
| 1-194623 | 8/1989 | Japan . |
| 1-218145 | 8/1989 | Japan . |
| 1-227540 | 9/1989 | Japan . |
| 4-167694 | 6/1992 | Japan . |
| 4-348690 | 12/1992 | Japan . |

OTHER PUBLICATIONS

"IC Memory Card Guidelines" Ver. 4 (Sep. 1991) published by Nihon Densikikaikogyo Shinko Kyokai (English).

Home VTR Nyumon (Oct. 1981) by Corona (Japanese).

*Primary Examiner*—Christopher B. Shin
*Attorney, Agent, or Firm*—Fay, Sharpe, Beall, Fagan, Minnich & McKee

[57] ABSTRACT

When a transmission request reception process controller accepts a request to transmit information, the information is read from a memory in order of addresses generated by an address generator. A transmission information generator adds addresses of the information to the read information, for transmission to the transmission requester. When accepting another request to transmit the same information while the information is being transmitted, the transmission request reception process controller causes the information to be transmitted to the latter transmission requester starting at the current point in the information being transmitted to the former transmission requester. After generating the last address of information, the address generator returns to the top address and again continues generating the addresses of the information. The information read from the memory according to the generated addresses is transmitted from output circuits 14 and 16. Each receiving party (information transmission requester) receives the transferred information and records it on record media thereof based on the addresses added to the information.

16 Claims, 11 Drawing Sheets

INFORMATION TRANSMISSION/ RECEPTION SYSTEM FOR TRANSMITTING INFORMATION TO REQUESTERS, WHERE IT IS RECORDED, IN RESPONSE TO A PLURALITY OF REQUESTS

BACKGROUND OF THE INVENTION

1. Field of the Invention

This invention relates to an information transmission system which transmits information, such as image information or audio information recorded as a cluster of information blocks, in response to information transmission requests from a large number of external machines. The invention also relates to information recording system of the external machines for recording the received information, and in particular relates to an information transmission system appropriate for shortening the time required from the issuing of a transmission request to the information transmission end to the transmitting of the information in response to information transmission requests, these requests coming from different external machines, and occurring at the same time, and from information recording devices associated with the information transmission system.

2. Description of the Related Art

Devices that can transmit information such as picture information and audio information include video tape recorders (VTRs), optical disk units, magnetic disk units, semiconductor memories, etc. The related art of these storage devices is described in IC Memory Card Guidelines Vet.4.1 (1991.9) published by Nihon Densikikaikogyo Shinko Kyokai and Home VTR Nyumon (or Introduction to Home VTR) (1971.10), published by Corona. With the storage devices in the related art, information can be written onto storage media and the written information can be read and transmitted externally. Likewise, at the receiving parties, the devices for recording the received information include video tape recorders (VTRs), optical disk units, magnetic disk units, semiconductor memories, etc. In the information recording devices, an area in which information can be recorded is reserved corresponding to the received information amount and the information is sequentially recorded starting at the beginning of the area.

By the way, it is anticipated that a system which holds information such as picture information, music information, and game software information as a database, and transmits necessary information to a plurality of external machines will come into demand, with high speed operation and large capacity of information transmission networks. Such a system, which transmits information, such as picture information, music information, and game software information to a plurality of external machines, requires a reception circuit for receiving information transmission requests from the external machines and a plurality of transmission circuits. Further, when a large number of information transmission requests occur for the same information at the same time, serial operation, in which information transmission responsive to the first transmission request is completed and then information is transmitted in response to the second transmission request, would mean that each external machine (the user of the external machine) has to wait for the length of time between the instant at which an information transmission request is issued and the instant at which information transmission is started. This wait time depends on the number of machines requesting information transmission, and so it is impossible to schedule the time interval. This problem becomes remarkable, particularly when transmission of picture information of a movie or the like, having an enormous information amount, is requested.

However, the storage devices do not generally comprise a plurality of reception circuits or a plurality of transmission circuits, and their control method is not explicit. Particularly, if a second information transmission request occurs while video information or audio information is being reproduced in response to a first information transmission request, the function of receiving the second request is not provided. Even if the storage devices have the capability of receiving a plurality of information transmission requests, when a second information transmission request occurs while information is being sent (video information or audio information is being reproduced) in response to a first information transmission request, it is considered that information transmission processing is performed in sequence in such a manner that information transmission responsive to the first transmission request is completed and then information is transmitted in response to the second transmission request. The information is always sent starting at the beginning, and not at an intermediate point of the information.

SUMMARY OF THE INVENTION

It is therefore an object of the invention to provide an information transmission/reception system which can receive a plurality of transmission requests and transmit information to the requesters so that it can be recorded by at the requesters, and an information transmission method.

It is another object of the invention to provide an information transmission apparatus and information reception apparatuses in the information transmission/reception system.

To these ends, according to the invention, there is provided an information transmission/reception system comprising an information transmission apparatus for transmitting information and a plurality of information reception apparatuses for receiving information. The information transmission apparatus comprises record media for recording the information; read means for reading the information recorded on the record media; address management means for specifying addresses of the information to be read by the read means; a plurality of reception means for receiving requests for transmission of the information recorded on the record media; generation means for generating transmission information by adding address information corresponding to the addresses specified by the address management means to the information read from the record media by the read means; a plurality of transmission means for sequentially transmitting the transmission information to which the address information is added by the generation means; and control means for controlling transmission of the information from the plurality of transmission means in accordance with reception of transmission requests at the plurality of reception means. Each of the information reception apparatuses comprises; transmission means for transmitting a request to transmit the information recorded on the record media to the information transmission apparatus; reception means for receiving the transmission information transmitted from the transmission means of the information transmission apparatus; record media for recording the transmission information received at the reception means of the information reception apparatus; and registering means for registering the transmission information received at the reception means of the information reception apparatus on the record media based on the address information added to the transmission information.

The address management means can comprise address generation means for sequentially generating the addresses in such a manner that it sequentially generates from a top address to an end address of the information, and then returns to the top address for again generating the addresses sequentially until an instruction for terminating the specification of the addresses is issued. It can also comprise a register, so that while the information is being transmitted to a first one of the information reception apparatuses through the first transmission means of the plurality of transmission means, upon receipt of a request to transmit the same information from a second one of the information reception apparatuses, a transmission start address of the information transmitted to the second information reception apparatus is held, and comparison means for comparing each address of the information read by the read means with the address held in the register, for detecting a match therebetween, so that while the information is being transmitted to the first information reception apparatus through the first transmission means, upon receipt of a request to transmit the same information from the second information reception apparatus, the control means of the information transmission apparatus controls the second transmission means so as to transmit the information to the second information reception apparatus starting at the current point at which the information is being transmitted to the first information reception apparatus through the first transmission means, and when the comparison means detects a match between the addresses, the control means can terminate the transmission of the information to the second information reception apparatus.

The control means of the information reception apparatus may have a detection means for detecting the reception termination of the information, based on the address information. Upon detection of the reception termination of the information, the transmission means of the information reception apparatus may send a notification of the information reception termination to the information transmission apparatus.

Upon receipt of the notification of the information reception termination from the transmission means of the information reception apparatus, the control means of the information transmission apparatus may terminate transmission of the information.

The generation means can divide information read by the read means into blocks of a predetermined length and add a block address to each information block as address information.

The generation means can further generate a total information amount of information read by the read means as transmission information data, and the detection means of the information reception apparatus can detect the reception termination of the information based on the total information amount instead of the address information.

The information transmission apparatus can further include a plurality of transmission information data generation means, each for generating at least one entry of predetermined identification information of the information transmission apparatus, an information name and information amount read by the read means, and a synchronous signal as transmission information data, the plurality of transmission information data generation means corresponding to the plurality of transmission means on a one-to-one basis.

According to the invention, there is provided an information transmission apparatus comprising record media for recording the information; read means for sequentially reading the information recorded on the record media; address management means for specifying addresses of the information read by the read means; a plurality of reception means for receiving requests for transmission of information recorded on the record media; generation means for generating transmission information by adding address information corresponding to the addresses managed by the address management means to the information read from the record media by the read means; a plurality of transmission means for sequentially transmitting the transmission information to which the address information is added by the generation means; and control means for controlling transmission of the information from the plurality of transmission means in accordance with reception of transmission requests at the plurality of reception means. The address management means can comprise address generation means for sequentially generating the addresses in such a manner that it sequentially generates from a top address to an end address of the information and then returns to the top address for again generating the addresses sequentially until an instruction for terminating the specification of the addresses is issued. The address management means can further comprise a register which, while the information is being transmitted through a first transmission means of the plurality of transmission means, and upon receipt of a request to transmit the same information, holds the transmission start address of the information transmitted through a second transmission means of the plurality of transmission, and comparison means for comparing each address of the information read by the read means with the address held in the register for detecting a match therebetween. While the information is being transmitted through the first transmission means, upon receipt of a request to transmit the same information, the control means can control the second transmission means so as to transmit the information starting at the current point in the information being transmitted through the first transmission means, and when the comparison means detects a match between the addresses, the control means can instruct the address generation means to terminate generation of the address for terminating the transmission of the information through the second transmission means.

According to the invention, there is provided an information reception apparatus comprising transmission means for transmitting an information transmission request to an information transmission apparatus which transmits information to which address information is added; reception means for receiving the transmission information transmitted from the information transmission apparatus received at the reception means of the information reception apparatuses; record media for recording the transmission information; and registration means for registering the transmission information received at the reception means on the record media based on the address information added to the transmission information. The information reception apparatus may further comprises detection means for detecting the reception termination of the information based on the address information, and upon detection of the reception termination of the information, the transmission means sends a notification of the information reception termination to the party transmitting information.

According to another aspect of the invention, there is provided, in an information transmission apparatus which has record media for recording information, accepts an information transmission request, and sends information, a method of transmitting information comprising the steps of accepting a first request to transmit the information; reading information from the record media in an address order; generating transmission information by adding address information corresponding to addresses of the read information to the read information; transmitting the transmission information which has been added to the address information to the first information transmission requester; transmitting the information to the second transmission requester starting at the current address of the information being transmitted to the first transmission requester, upon acceptance of a second request to transmit the same information while the information is being transmitted; returning to a top address after transmitting the information up to an end address of the information; and continuing the transmission of the information.

The information transmission apparatus receives information transmission requests at a plurality of reception means. The address management means specifies the addresses of the information to be read for the read means, and the read means reads the information recorded on the record media according to the addresses. The generation means adds address information corresponding to the addresses specified by the address management means to the information read by the read means for generating transmission information. The control means is responsive to reception of transmission requests at a plurality of reception means for controlling transmission of the information from the plurality of transmission means. A plurality of transmission means sequentially transmit the transmission information, to which the address information is added by the generation means. Thus, an information transmission/reception system which can receive a plurality of transmission requests and transmit information to the requesters so that it can be recorded at the requesting end, can be provided.

When the address management means comprises the address generation means, the register, and the comparison means, the address generation means sequentially generates the addresses in such a manner that it sequentially generates from a top address to an end address of the information and then returns to the top address for again generating the addresses sequentially until an instruction for terminating the specification of the addresses is issued. While the information is being transmitted to a first one of the information reception apparatuses through the first transmission means, upon receipt of a request for transmitting the same information from a second one of the information reception apparatuses, the register holds the transmission start address of the information transmitted to the second information reception apparatus. The comparison means compares each address of the information read by the read means with the address held in the register, for detecting a match therebetween. While the information is being transmitted to the first information reception apparatus through the first transmission means, upon receipt of a request for transmitting the same information from the second information reception apparatus, the control means of the information transmission apparatus controls the second transmission means for transmitting the information to the second information reception apparatus, starting at the current point in the information being transmitted to the first information reception apparatus through the first transmission means, and when the comparison means detects a match between the addresses, the control means instructs the address generation means to terminate of generating the address for terminating the transmission of the information to the second information reception apparatus.

When receiving a second information transmission request while transmitting information in response to a first information transmission request, the information transmission apparatus of the invention also transmits the information being transmitted in response to the first transmission request to the second transmission requester. For example, when a one-third portion of movie information has been transmitted, if a second information transmission request is received, the same information as the information portion after the one-third portion of the movie information transmitted to the first information requester, is also sent to the second information requester. After the remaining (two-thirds) portion of the movie information has been sent to the first and second information requesters, the beginning one-third portion of the movie information is transmitted only to the second information requester.

Here, the information is transmitted together with the total information amount and addresses. In this example, information transmission in response to two information transmission requests has been discussed, but similar operation is performed when three or more requests are received. That is, if another information transmission request is received while information is being transmitted, the information being transmitted is also transmitted to the information transmission requester without waiting for the current information transmission to be completed.

Thus, the time required from issuing an information transmission request to completion of information reception depends substantially on the information transmission amount and does not depend on the number of machines making information transmission requests.

On the other hand, the information reception apparatus reserves a record area based on the received data indicating the total information amount, and starts recording the information at the corresponding location in the reserved record area according to the received address information. That is, after the record area is reserved, recording of the information is started at an intermediate location in the record area corresponding to the transmission start address. After this, the information is recorded up to the last address according to the received address information, then a return is made to the first address of the information and the information recording is continued to the address preceding the transmission start address, thereby completing the recording of the information in the total information amount. Thus, the time required from issuing an information transmission request to completion of information reception depends on the total information amount, and if the user waits for a given time determined by the total information amount, he or she can be assured of receiving the requested information, and can enjoy remarkably improved operability.

DESCRIPTION OF THE PREFERRED EMBODIMENTS

Referring now to the accompanying drawings, there are shown preferred embodiments of the invention.

Figure 1:
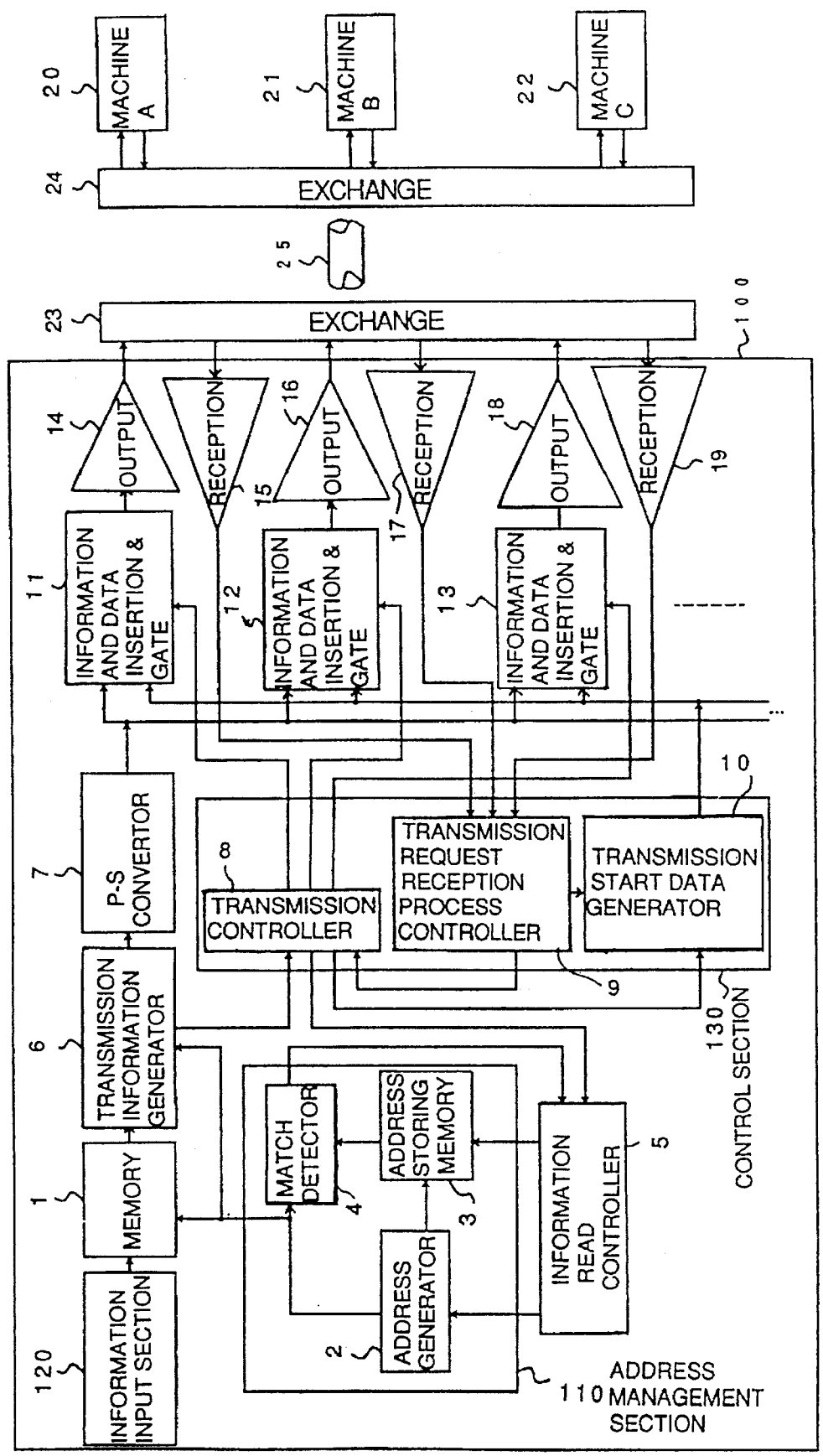
FIG. 1 is a block diagram of a first embodiment of an information transmission apparatus of the invention.

FIG. 1 is a block diagram showing one embodiment of an information transmission apparatus 100 for practicing the invention. In the embodiment, when receiving an information transmission request from an information reception apparatus of a first external machine, the information transmission apparatus reads information in block units from storage media and transmits the information with the block address of the information to the first external machine. When receiving another information transmission request from a second external machine while transmitting the information to the first external machine, the information transmission apparatus also transmits the current information being transmitted to the first external machine to the second external machine. At that time, the information transmission apparatus holds the transmission start address of the information transmitted to the second external machine. Then, when reading the information at the last address, the information transmission apparatus returns to the first address of the information and continues to read the information up to the address at which the information transmission to the second external machine was started. On the other hand, the external machine records the received information based on the addresses added to the information. By monitoring the addresses when all of a cluster of information blocks has ben received, the external machine is able to send a notification of the reception termination to the information transmission apparatus and therefore terminates the reception.

The information transmission apparatus will be discussed in detail with reference to FIG. 1.

In FIG. 1, numeral 1 is a memory which stores a cluster of information such as picture information or audio information. Numeral 120 is an information input section for inputting information to be stored in the memory 1. Numeral 2 is an address generator which generates addresses for reading and writing information from and into the memory 1. The address generator 2 generates addresses sequentially. When generating the last address of the information stored in the memory 1, the address generator 2 again generates the first address, the second address, and so forth. The last address is held in the address generator 2 when information is recorded in the memory 1. Numeral 3 is an address storing memory which stores an address generated by the address generator 2 based on an output signal from an information read controller 5. The store contents of the memory 3 are updated each time an information transmission request is received. Numeral 4 is a match detector for detecting a match between the address stored in the address storing memory 3 and the address output by the address generator 2. The functions of the address generator 2, the address storing memory 3, and the match detector 4 may be combined to form an address management section 110 for managing addresses. The information read controller 5 controls the operation of the address generator 2 and the operation of the address storing memory 3. Numeral 6 is a transmission information generator which divides information sequentially read from the memory 1 into information blocks of a predetermined length, generates transmission information to which a block address and error correction code are added for each information block, and when outputting the generated block information to a parallel-serial converter (P-S converter) 7, sends a block information output timing signal to a transmission controller 8 for indicating the block information output timing. The P-S converter 7 converts parallel information into serial information. The transmission controller 8 controls information and data insertion and gate circuits 11 to 13 for addition of a transmission start signal when information is transmitted, information transmission timing, information transmission termination, etc. The transmission controller 8 has storage means for storing a transmission requester and transmission information name when a transmission request signal is received. Numeral 9 is a transmission request reception process controller which receives information transmission requests issued from a plurality of external machines through reception circuits 15, 17, and 19 and outputs information transmission request signals to the transmission controller 8. Numeral 10 is a transmission start data generator which holds a transmission start signal and transmission information data such as total information amount data added when information is transmitted, and generates them in response to an information transmission request output signal from the transmission controller 8. The information and data insertion and gate circuits 11 to 13 are provided for transmitting information to the external machines in response to an output signal of the transmission controller 8. Numerals 14, 16, and 18 are output circuits for outputting information to the external machines. The reception circuits 15, 17, and 19 receive information transmission requests issued. from the external machines. The output circuits and reception circuits can be connected to communication lines such as telephone lines or ISDN lines and provided with a modem function of modulating information for transmission and demodulating received signals. Numerals 20, 21, and 22 are external machines A, B, and C each comprising a video tape recorder (VTR) such as an information decoder installed in each home, an optical disk unit, a magnetic disk unit, a semiconductor memory, or the like provided with communication means, as described below with reference to FIG. 4. Numerals 23 and 24 are exchanges for exchanging information based on destination information. Numeral 25 is a transmission line connecting the exchanges.

Next, one example of an information storage system of the external machine described above for storing received information from the information transmission apparatus will be discussed with reference to FIG. 4, which is a block diagram showing one example of the information storage system using a magneto-optic recorder.

Figure 4:
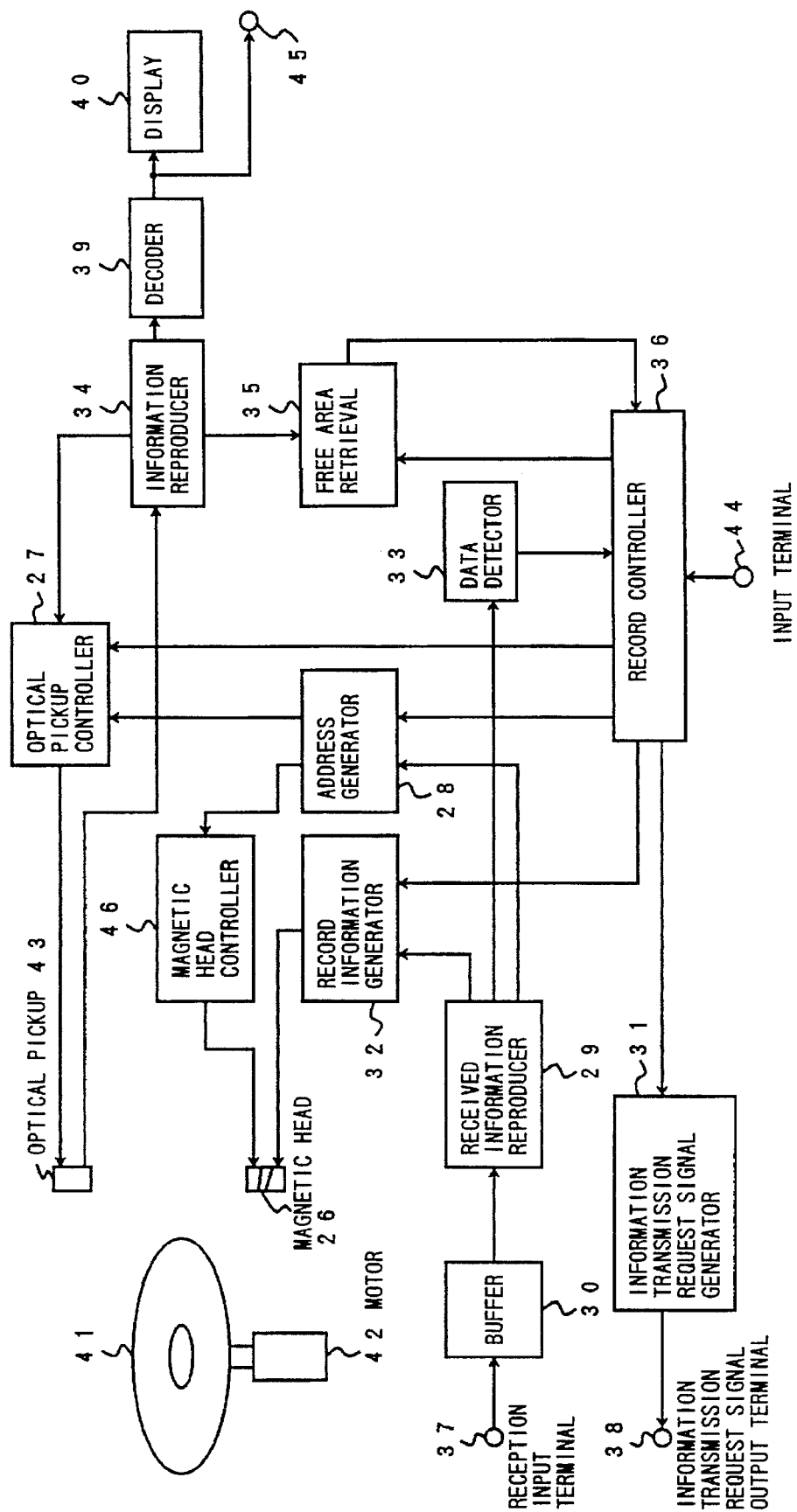
FIG. 4 is a block diagram of one embodiment of an information reception apparatus of the invention.

In FIG. 4, numeral 26 is a magnetic head and numeral 27 is an optical pickup controller which controls an optical pickup. Numeral 28 is an address generator which generates addresses for storing or reading information. Numeral 29 is a received information reproducer which reproduces received information and carries out an error correction according to parity. Numeral 30 is a buffer circuit for storing received information. Numeral 31 is an information transmission request signal generator which generates an information transmission request signal, as instructed. Numeral 32 is a record information generator which converts received information into signal form for storing on magneto-optic media. Numeral 33 is a data detector which detects transmission information data such as the transmission information amount and transmission start address, from the received information. Numeral 34 is an information reproducer which reproduces information from signals read from magneto-optic media. Numeral 35 is a free area retrieval circuit for retrieving a free area to record received information. Numeral 36 is a record controller which controls the address generator 28 based on output information from the data detector 33 and output information from the free area retrieval circuit 35 and the information transmission request signal generator 31 based on an information transmission request input through an input terminal 44. Numeral 37 is a reception input terminal of transferred information and numeral 38 is an information transmission request signal output terminal. The terminals 37 and 38 are connected to the transmission line 25. Numeral 39 is a decoder which decodes information reproduced by the information reproducer 34 into video signals, audio signals, game signals, etc. Numeral 40 is a video signal display, numeral 41 is magneto-optic media, numeral 42 is a motor, and numeral 43 is an optical pickup. Numeral 44 is an information transmission request input terminal for receiving an information transmission request from the user. Numeral 45 is a digital output terminal of the decoder 39 and numeral 46 is a magnetic head controller which controls the position of the magnetic head 26.

At the external machine, the record controller 36 interprets an information transmission request input through the input terminal 44 and outputs it to the information transmission request signal generator 31, which then generates an information transmission request signal based on the output of the record controller 36 and transmits it through the output terminal 38. The information transmission request signal consists of an information signal of the transmission request information number, information reception party, payment method, etc.

Figure 2:
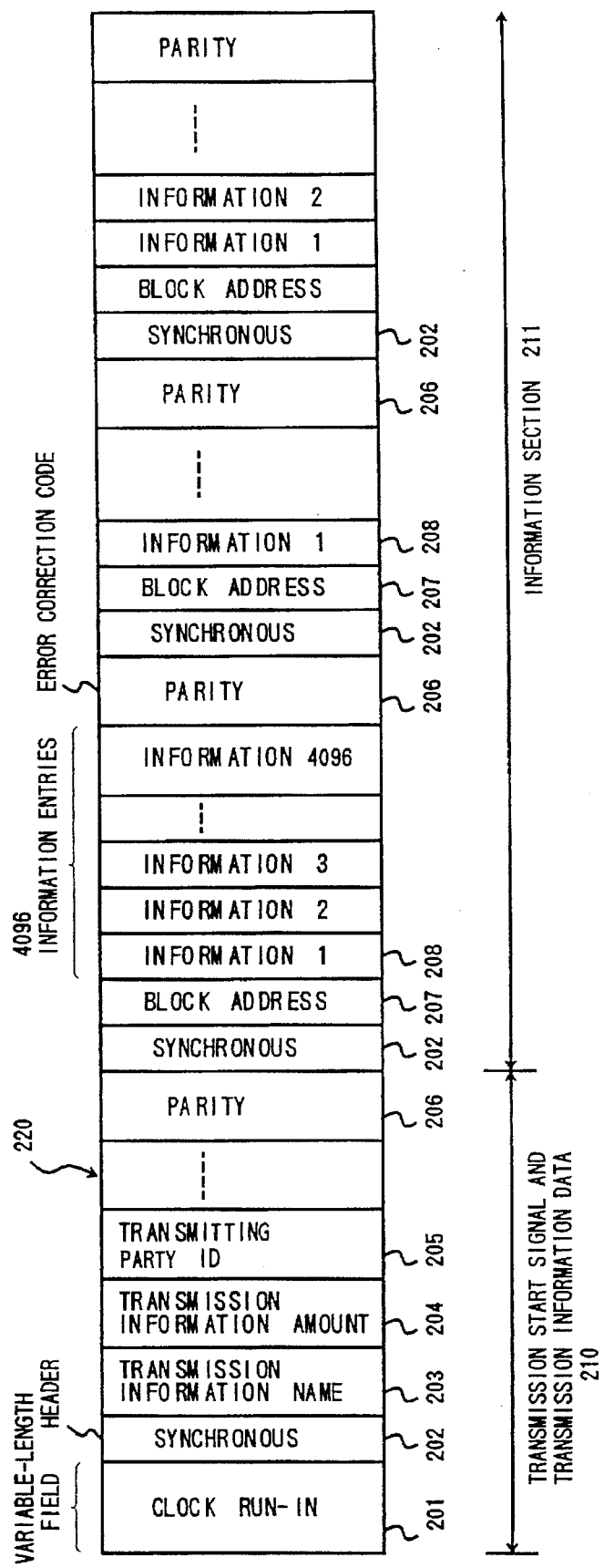
FIG. 2 is an illustration showing the format of data and information sent from the information transmission apparatus of the invention shown in FIG. 1.
Figure 8:
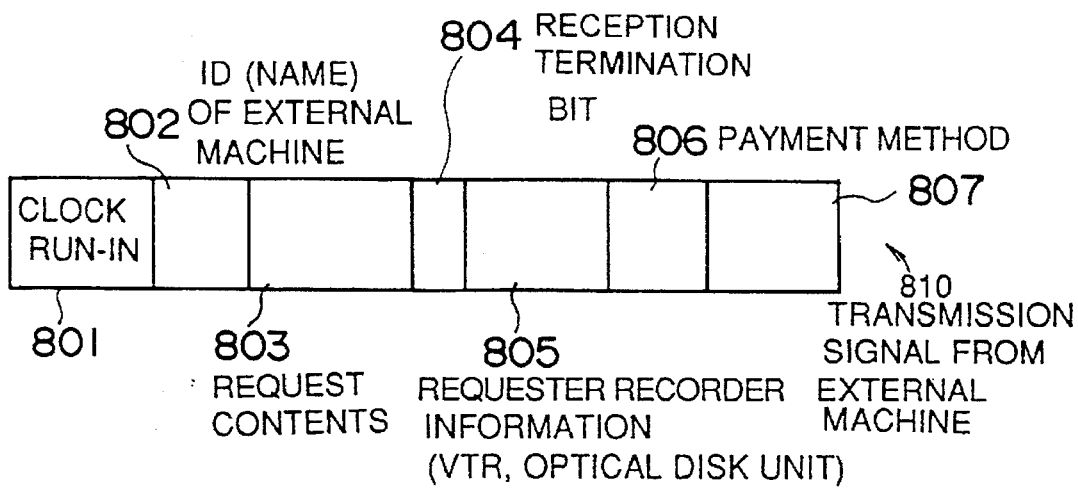
FIG. 8 is an illustration showing the format of data sent from the information reception apparatus of the invention.

FIG. 8 shows the data format in which a transmission request or reception termination notification is sent from the external machine to the information transmission apparatus. FIG. 2 shows the format of information and data sent from the transmission apparatus to the external system.

In FIG. 8, a transmission signal 810 from the external machine comprises a clock run-in 801 containing timing information for clock reproduction at the receiving party, an ID 802 indicating predetermined identification information of the transmitting external machine, request contents 803 indicating the transmission request contents, a reception termination bit 804 indicating the reception termination, requester recorder information 805 indicating the type of requesting external machine, a payment method 806 indicating the payment method for information to be received, and a reserved area 807. If the information transmission apparatus 100 stores different entries of information, identification information corresponding to the entry can be specified in the request contents 803. For example, the type, such as a VTR or an optical disk unit, can be specified in the requester recorder information 805. Information indicating a predetermined payment method, such as a credit card or cash, can be set in the payment method 806. To make a transmission request, the external machine sets the data fields other than the reception termination bit 804 for transmission. At the termination of information reception from the information transmission apparatus 100, the external machine sets the clock run-in 801, the ID 802, and the reception termination bit 803 and sends them to the information transmission apparatus 100.

As shown in FIG. 2, a transmission signal 220 from the information transmission apparatus 100 comprises transmission start signal and transmission information data 210 and an information section 211. The transmission start signal and transmission information data 210 comprises a clock run-in 201 containing timing information for clock reproduction at the receiving party, a synchronous signal 202 containing header information indicating the beginning of signal, a transmission information name 203 indicating the name of information to be transmitted, a transmission information amount 204 indicating the amount of information to be transmitted, a transmitting party ID 205 indicating predetermined identification information of the transmitting party, and parity 206 to enable an error check. If different kinds of information are available, information indicating the kind, for example, a movie name for movie information, can be specified in the transmission information name 203. The external machine at the receiving party holds the transmission information amount 204, and when the received information amount matches the transmission information amount 204, it can send the reception termination bit to the information transmission apparatus 100 by assuming that all information has been received. If information is divided into blocks of a predetermined information length, synchronous signal 202, block address 207, information 208, and parity 206 are transmitted for each block as the information section 211. The length of the clock run-in 201 may be made variable. This is used to adjust the information output timing.

The memory 1 stores a cluster of picture information such as a movie, a cluster of audio information such as popular or classic music, or game software. The information transmission apparatus 100 transmits the stored information in response to an information transmission request issued from an information decoder of an external machine A 20, B 21, C 22, etc., installed in each home. The information decoder stores the received information, then restores it to a movie or music for output, or performs processing for the user to play a game.

Figure 9:
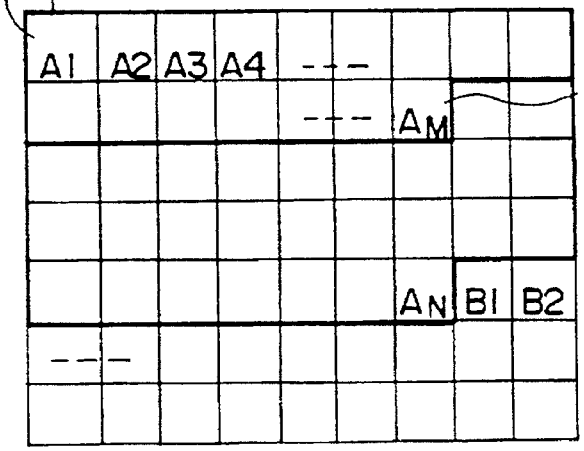
FIG. 9 is an illustration of the block configuration of a memory.
Figure 10:
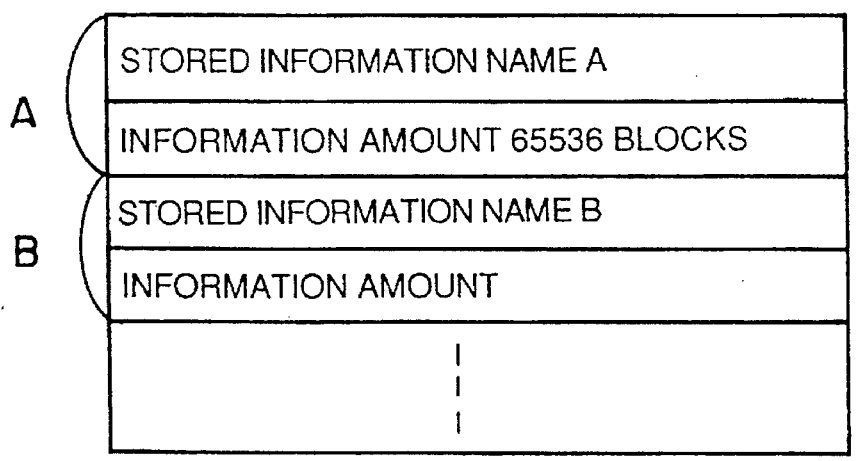
FIG. 10 is a holding table in a transmission start data generator.

Next, the block configuration of the contents recorded in the memory 1 will be discussed with reference to FIG. 9. As shown here, information having any information amount is previously recorded in the memory 1 via the information input section 120. Here, how information A and information B are recorded is shown. Assume that the information amount of information A is A1 to AN (each of A1–AN denotes an address of 16-bit information, which is an access unit to the memory 1, where N=268,000,000). Here, assuming that the block length is 65,536 bits (4096×16 bits), A1 to AM (M=4096) make up one block. In this case, information A is divided into 65536 (FFFF (hexadecimal representation)) blocks. The information names and information amounts concerning the contents recorded in the memory 1 are previously held in the transmission start data generator 10. The transmission start data generator 10 has a table as shown in FIG. 10 for holding the information names and amounts of the information. The top addresses of the information are held (not shown) in the transmission request reception process controller 9. The top addresses may be held in the holding table of the transmission start data generator 10 for the transmission request reception process controller 9 to look up the top address in the table when necessary.

Figure 13:
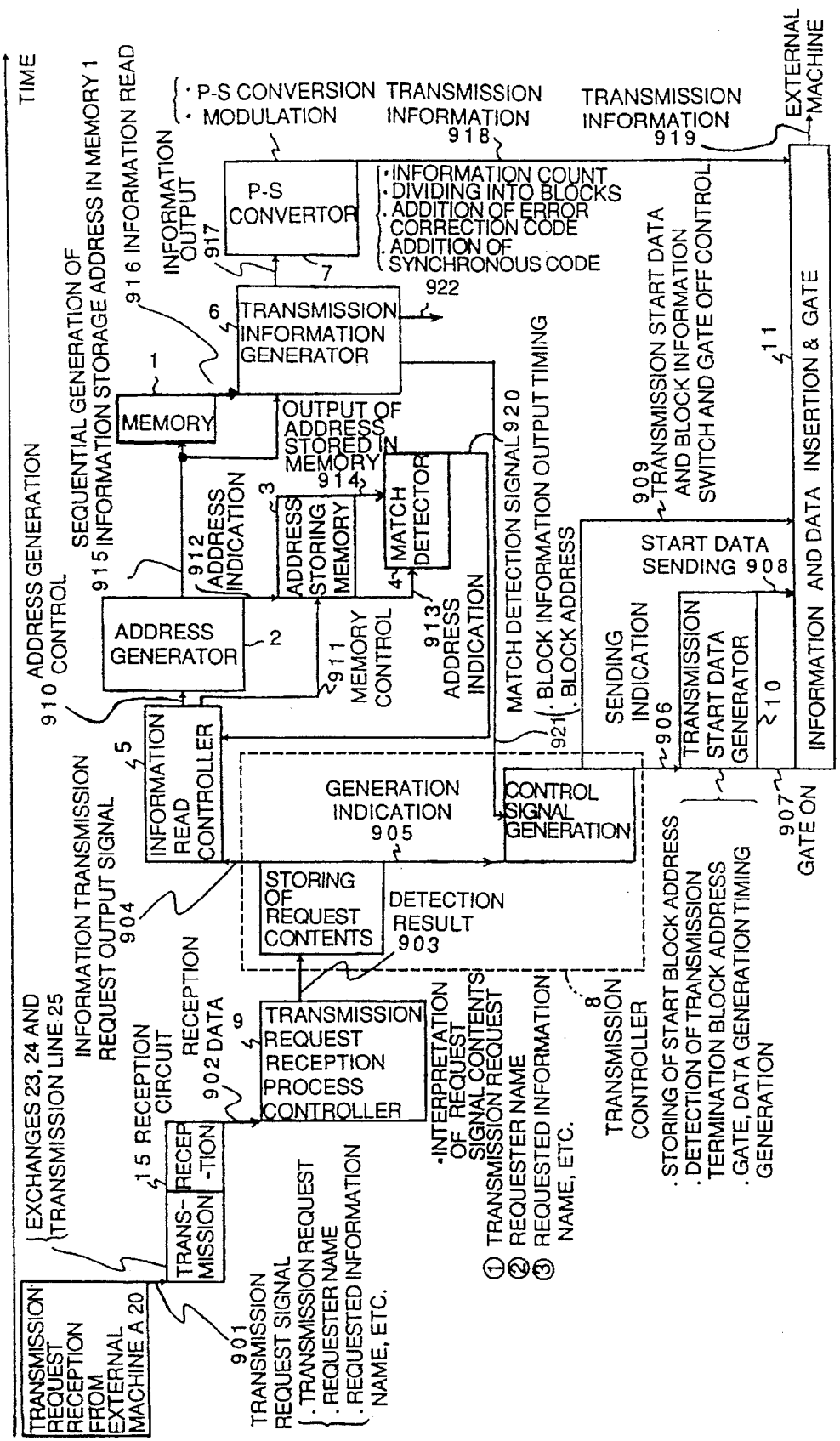
FIG. 13 is a conceptual diagram representing a flow of the operation of the information transmission apparatus of the invention.

Next, the operation of the information transmission apparatus 100 when the external machine A 20 outputs an information transmission request signal will be described with reference to FIGS. 1 and 13. For simplicity, the embodiment assumes that the memory 1 stores one entry of information. An example of storing different entries of information in the memory 1 will be discussed below. FIG. 13 shows a conceptual diagram representing a time flow of the control operations among the blocks of the information transmission apparatus 100 when the external machine A 20 outputs an information transmission request signal.

When the external machine A 20 outputs an information transmission request signal 901, the signal 901 is sent via the exchange 24, the transmission line 25, and the exchange 23 to the information transmission apparatus 100 and is received by the reception circuit 15, which then outputs the signal 902 to the transmission request reception process controller 9, which then detects an information transmission request being issued from the external machine A 20 from the requester ID contained in the signal and outputs a detection result 903, indicating reception of the information transmission request from the external machine A 20, to the transmission controller 8.

The transmission controller 8 stores the detection result 903 of the transmission request reception process controller 9 in the storage means, and also outputs a control signal (transmission instruction) 909 for starting information transmission to the external machine A 20 to the information and data insertion and gate circuit 11 based on the detection result of the transmission request reception process controller 9 and a block information output timing signal of the transmission information generator 6, thereby controlling the information and data insertion and gate circuit 11. Further, the transmission controller 8 outputs an information transmission request output signal 904, indicating information transmission request reception, to the information read controller 5 and sending indication signal 906 to the transmission start data generator 10. When receiving the information transmission request output signal from the transmission controller 8, the transmission start data generator 10 reads and outputs the transmission start signal and transmission information data 210, as shown in FIG. 2, from the holding table. The clock run-in 201, the synchronous signal 202, and the transmitting party ID 205 are provided as a predetermined pattern of data held, or are prepared each time. As shown in FIG. 2, data items such as the clock run-in for clock reproduction at the receiving party, the transmission information name, the total transmission information amount, and the information transmitting party ID are transmitted before any acted information is sent.

When receiving the information transmission request output signal 904 from the transmission controller 8, the information read controller 5 instructs the address generator 2 to generate addresses. Then, the address generator 2 generates the block addresses for the blocks and the addresses for reading information from the memory 1 (A1–AN described above) in sequence from the first address, whereby information is read from the memory 1. The transmission information generator 6 divides the information read from the memory 1 into blocks and adds the synchronous signal 202, the block address 207, and parity (error correction code) 206 required for each block. As the method of dividing the information into blocks, a cluster of information (268,000,000×16 bits) read from the memory 1 is divided into blocks, each consisting of 65,536 bits, as shown in FIG. 9 and discussed above. Block addresses 0000 to FFFF (hexadecimal representation) are assigned to the information blocks. Further, an error correction code, such as a parity cod,e is added to each block to enable error correction for transmitting the information.

Figure 11:
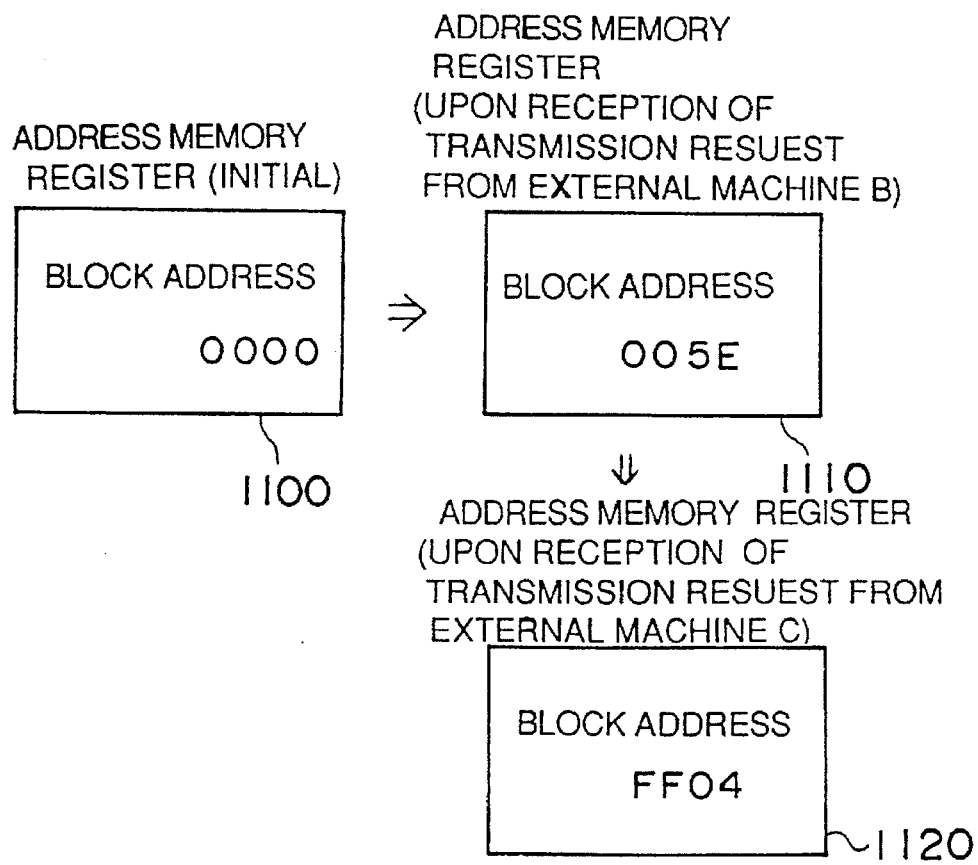
FIG. 11 is an illustration showing the storage contents of an address/memory register.

The information read controller 5 outputs a memory control signal 911 for instructing the address storing memory 3 to store the address information generated by the address generator 2 for rewriting the current address information generated by the address generator 2 into the address storing memory 3. The address storing memory 3 holds the current generated block address, as shown in FIG. 11. Here, the address storing memory 3 holds the first block address because of the first transmission request.

Figure 12:
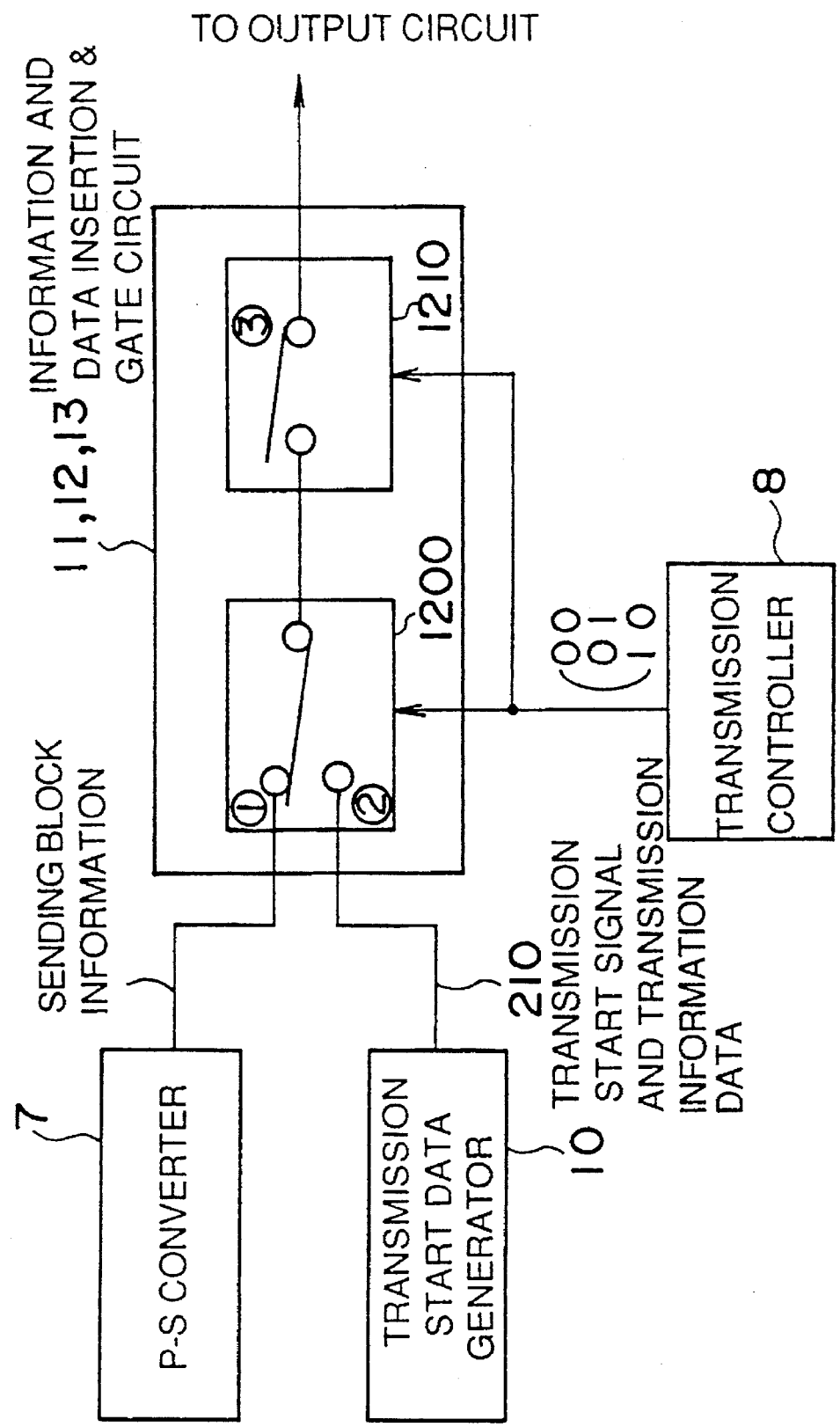
FIG. 12 is a block diagram of an information and data insertion and gate circuit.

When receiving the control signal 909 from the transmission controller 8, the information and data insertion and gate circuit 11 first performs the operation of sending the transmission start signal and transmission information data 210 generated by the transmission start data generator 10 to the external machine A 20. Upon completion of sending the transmission start signal and transmission information data 210, then the information and data insertion and gate circuit 11 performs the operation of sending information converted into transmission information format by the P-S converter via the transmission information generator 6. FIG. 12 shows a specific example of a block diagram of the information and data insertion and gate circuit 11. As shown here, the information and data insertion and gate circuit 11 comprises two switches 1200 and 1210, which are controlled by a control signal from the transmission controller 8 (in this case, the control signal may consist of two bits). The switch 1200 is connected to the P-S converter 7 and the transmission start data generator 10 for selecting an output of either one of them. The switch 1210 switches the output of the switch 1200 in response to a control signal indicating whether or not the output is to be fed to the output circuit at the following stage. The transmission controller 8 controls the information and data insertion and gate circuit 11 so as to provide the format as shown in FIG. 2.

The output signal of the information and data insertion and gate circuit 11 is transmitted via the output circuit 14, the exchange 23, the inter-exchange transmission line 25, and the exchange 24 to the external machine A 20 issuing the information transmission request.

The external machine A stores the received information, then decodes it into a video signal, audio signal, a game, or the like. The operation of the external machine will be discussed below.

Next, one feature of the invention, namely, the operation of the information transmission apparatus 100 in response to information transmission requests issued from a plurality of external machines will be explained. In the embodiment, the data transfer time to completion of information transmission for each external machine can be made the same as a given time conforming to the information amount, namely, the information transmission time required when one external machine makes an information transmission request described above.

Assume that another data transmission request is issued from external machine B 21 while information is being transmitted to external machine A 20 in response to an information transmission request therefrom.

The information transmission request signal 901 from the external machine B 21 is sent via the exchange 24, the transmission line 25, and the exchange 23 to the information transmission apparatus 100 and is received by the reception circuit 17, which then outputs the signal 902 to the transmission request reception process controller 9, which then detects an information transmission request being issued from the external machine B 21 and outputs detection result 903 indicating reception of the information transmission request from the external machine B 21 to the transmission controller 8.

The transmission controller 8 stores the detection result 903 of the transmission request reception process controller 9 in the storage means, and also immediately outputs a control signal for starting information transmission to the external machine B 21 to the information and data insertion and gate circuit 12, without disturbing the information transmission operation to the external machine A 20, based on the detection result of the transmission request reception process controller 9 and a block information output timing signal of the transmission information generator 6. The control signal generated by the transmission controller 8 synchronizes with the block data output timing signal of the transmission information generator 6. Based on the control signal, the information and data insertion and gate circuit 12 is controlled to start information transmission to the external machine B 21. Further, the transmission controller 8 outputs an information transmission request output signal indicating information transmission request reception to the information read controller 5 and the transmission start data generator 10. When receiving the information transmission request output signal from the transmission controller 8, the transmission start data generator 10 outputs the transmission start signal and transmission information data 210.

By the way, since information is being transmitted to the external machine A 20, the transmission information generator 6 divides a cluster of information read from the memory 1 into 65,536 blocks and outputs block addresses, assigned to block information, in sequence. Therefore, when the information and data insertion and gate circuit 12 switches the operation from sending the transmission start signal and transmission information data 210 output by the transmission start data generator 10 to sending the information stored in the memory 1 output by the P-S converter, information transmission to the external machine B 21 is started at an intermediate point of the information being transmitted to the external machine A 20. The operation of the information and data insertion and gate circuit 12 is switched in synchronization with the block information output timing signal of the transmission information generator 6 and therefore the information transmitted to the external machine B 21 is started at the separation of block addresses. The operation will be discussed with reference to FIG. 3, wherein the fields such as the synchronous signal, information, and error correction signal are omitted and only block addresses are shown.

Figure 3:
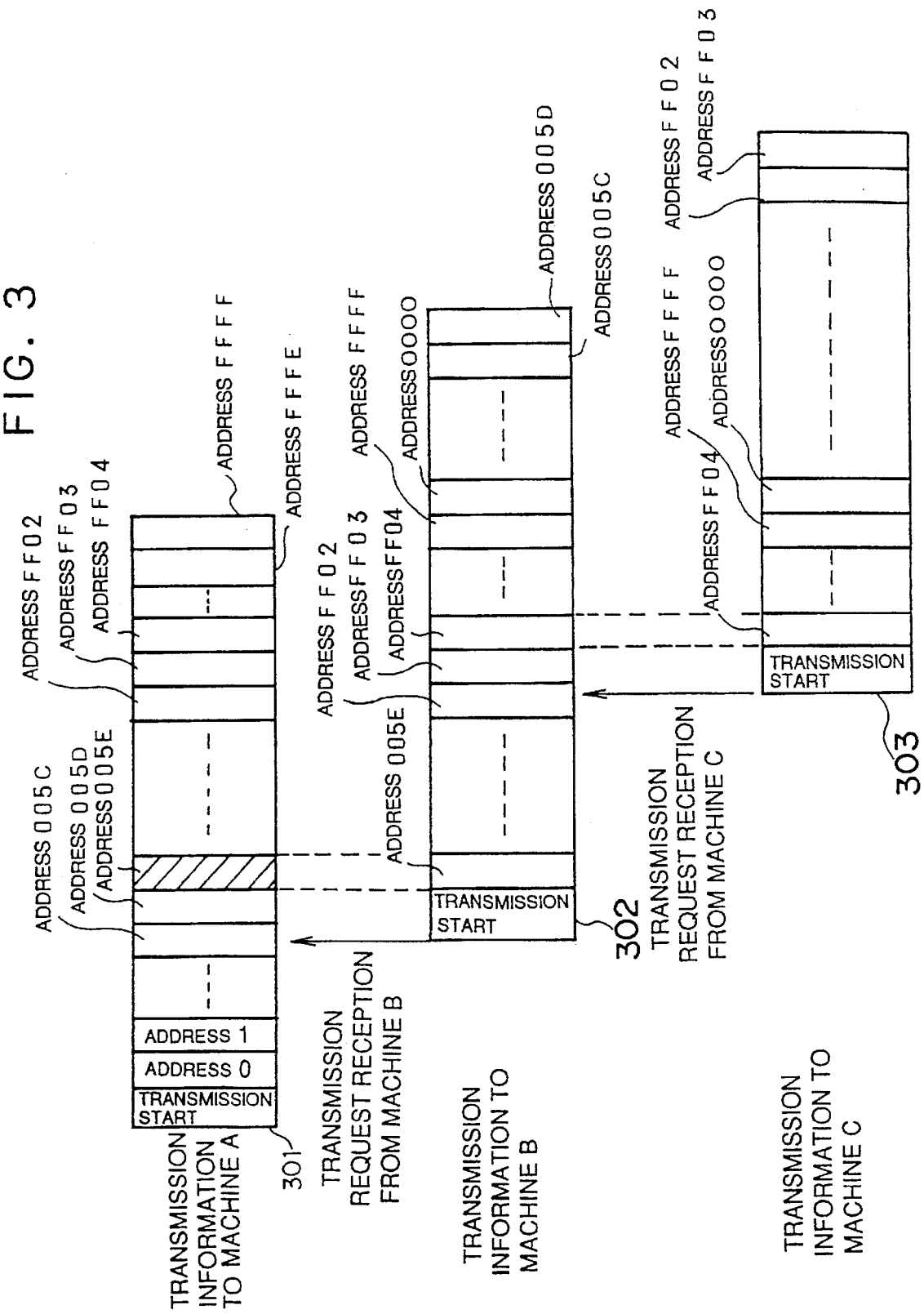
FIG. 3 is an illustration showing the operation of an information transmission/reception system of the invention.

Assume that information divided into blocks is transmitted to the external machine A 20, as shown in FIG. 3. When an information transmission request is received from the external machine B 21 while the block information at block address 005C (hexadecimal representation) is being transmitted to the external machine A 20, the transmission controller 8 outputs a control signal to the information and data insertion and gate circuit 12 and the information read controller 5 at the time of block address 005D (hexadecimal representation) as shown in FIG. 3, without disturbing the information transmission operation to the external machine A 20, based on the detection result of the transmission request reception process controller 9 and a block information output timing signal of the transmission information generator 6.

Based on the control signal, the information and data insertion and gate circuit 12 is controlled to start information transmission to the external machine B 21 by outputting the transmission start signal and transmission information data 210 generated by the transmission start data generator 10 to the external machine B 21. Assuming that the transmission of the transmission start signal and transmission information data 210 to the external machine B 21 is completed while the block information at block address 005D (hexadecimal representation) is being transmitted to the external machine A 20, transmission of the information stored in the memory 1 to the external machine B 21 is started at block address 005E (hexadecimal representation) by the operation of the information and data insertion and gate circuit 12.

When receiving the control output signal from the transmission controller 8, the information and data insertion and gate circuit 12 performs the operation of transmitting the transmission start signal and transmission information data 210 generated by the transmission start data generator 10 to the external machine B 21.

Upon completion of the transmission of the transmission start signal and transmission information data 210, the information and data insertion and gate circuit 12 performs the operation of transmitting the information, converted into transmission information form by the transmission information generator 6 and the P-S converter 7, to the external machine B 21.

When receiving the information transmission request output signal 904 from the transmission controller 8, the information read controller 5 controls so that the address information generated by the address generator 2 is stored in the address storing memory 3 for writing the current block address generated by the address generator 2 into the address storing memory 3. Thus, the block address is rewritten as shown in the address memory register 1110 in FIG. 11. This means that the memory address corresponding to the block address 005E (hexadecimal representation) is stored in the address storing memory 3.

The match detector 4 compares the block address stored in the address storing memory 3 with the block address generated by the address generator 2. When they match, the match detector 4 outputs a match signal to the information read controller 5, which then outputs a control signal 920 to stop the operation of the address generator 2. Since the information transmission request is received from the external machine B 21, read of the information from the memory 1 is performed until block address FFFF (hexadecimal representation), and then information is read from the top block address to address 005E (hexadecimal representation) under the control of the information read controller 5. Alternatively, the match detector 4 may compare the block address just preceding the block address stored in the address storing memory 3 (in the example, 005D) with the block address generated by the address generator 2, thereby enabling read of the information up to 005D. Transmission of the information to the external machines can be terminated separately upon receipt a reception termination notification from each of the external machines, as described below. Alternatively, the transmission controller 8 in the information transmission apparatus may hold the top block address of transmission for each external machine and detect the transmission termination to each external machine separately, in order to terminate the transmission.

By performing the processing as described above, the transmission of the information to the external machine A 20 terminates at block address FFFF and that to the external machine B 21 terminates at address 005D (hexadecimal representation).

Assuming that an information transmission request is received from the external machine C 22 in addition to the external machine B 21 while the block information at block address FF02 (hexadecimal representation) is being transmitted, as shown in FIG. 3, similar processing to that of the information transmission request received from the external machine B 21 is performed. For example, when an information transmission request is received from the external machine C 22 while the block information at block address FF02 (hexadecimal representation) is being transmitted to the external machines A 20 and B 21, the transmission controller 8 outputs a control signal to the information and data insertion and gate circuit 13 and the information read controller 5 at the time of block address FF03 (hexadecimal representation) as shown in FIG. 3, without disturbing the information transmission operation to the external machines A 20 and B 21, based on the detection result of the transmission request reception process controller 9 and a block information output timing signal of the transmission information generator 6. Based on the control signal, the information and data insertion and gate circuit 13 is controlled to start information transmission to the external machine C 22 by outputting the transmission start signal and transmission information data 210 generated by the transmission start data generator 10 to the external machine C 22. Assuming that the transmission of the transmission start signal and transmission information data 210 to the external machine C 22 is completed while the block information at block address FF03 (hexadecimal representation) is being transmitted to the external machines A 20 and B 21, transmission of the information stored in the memory 1 to the external machine C 22 is started at block address FF04 (hexadecimal representation) by the operation of the information and data insertion and gate circuit 13. On the other hand, when receiving the control signal from the transmission controller 8, the information read controller 5 controls so that the address information generated by the address generator 2 is stored in the address storing memory 3 for rewriting the memory contents of the address storing memory 3. That is, the memory address corresponding to the block address FF04 (hexadecimal representation) is stored in the address storing memory 3 in place of block address 005E (hexadecimal representation) as shown in 1120 in FIG. 11. Therefore, when the information transmission request is received from the external machine C 22 in addition to the information transmission request from the external machine B 21, read of the information from the memory 1 is performed to block address FF04 (hexadecimal representation) instead of the read end block address 005E (hexadecimal representation) for the external machine B 21 described above. The transmission of the information to the external machine C 22 terminates at block address FF03 (hexadecimal representation).

The output signals of the information and data insertion and gate circuits 12 and 13 are transmitted via the output circuits 16 and 18, the exchange 23, the inter-exchange transmission line 25, and the exchange 24 to the external machines B 21 and C 22 issuing the information transmission requests. The external machines B and C store the received information, then decodes it into a video signal, audio signal, a game, or the like.

As described above, when a large number of information transmission requests occur for the same information at the same time, a serial operation, in which information transmission responsive to the first transmission request is completed and then information is transmitted in response to the second transmission request causes each external machine (the user of the external machine) to wait for the time interval between the instant at which an information transmission request is issued and the instant at which information transmission is started. The wait time depends on the number of machines requesting information transmission, thus the time interval becomes nonscheduled. Thus, the time interval between the instant at which an information transmission request is issued and the instant at which information reception is completed varies from time to time. It is difficult to estimate the required time. According to the embodiment, the time required from issuing an information transmission request to completion of information reception depends on the information transmission amount and does not depend on the number of machines making information transmission requests. Therefore, the embodiment is characterized by the fact that if the user waits for a given time determined by the transmission information amount, he or she can be assured of receiving the requested information, and enjoy remarkably improved operability.

Next, the operation of the external machine will be discussed with reference to FIGS. 2 and 4. The external machine receives information in the format shown in FIG. 2, transmitted from the information transmission apparatus in response to an information transmission request signal issued from the output terminal 38, through the input terminal 37 and stores the received information in the buffer 30. Then, the received information reproducer 29 performs clock reproduction, data identification, error correction, etc., for the received information in order to reproduce the information in the format as shown in FIG. 2. Further, the received information reproducer 29 separates the block addresses 207, the information 208, and the transmission information data 210 from the reproduced information. Then, the received information reproducer 29 outputs the block addresses 207 to the address generator 28, the information 208 to the record data generator 32, and the transmission information data 210 and the top block address 207 to the data detector 33. The data detector 33 decodes the transmission information data and outputs the information data items such as the transmission information name 203, the transmission information amount 204, and the transmitting party ID 205 and the top block address 207 to the record controller 36. The record controller 36 stores the transmission information amount 204 and the top block address 207, and retrieves an information recording area on the magneto-optic media 41 corresponding to the transmission information amount 204 at the free area retrieval circuit 35 for finding start address information at which the information can be recorded. The address generator 28 generates record addresses of the received information in sequence, based on the start address information provided by the record controller 36, and the block addresses from the received information reproducer 29.

Figure 5:
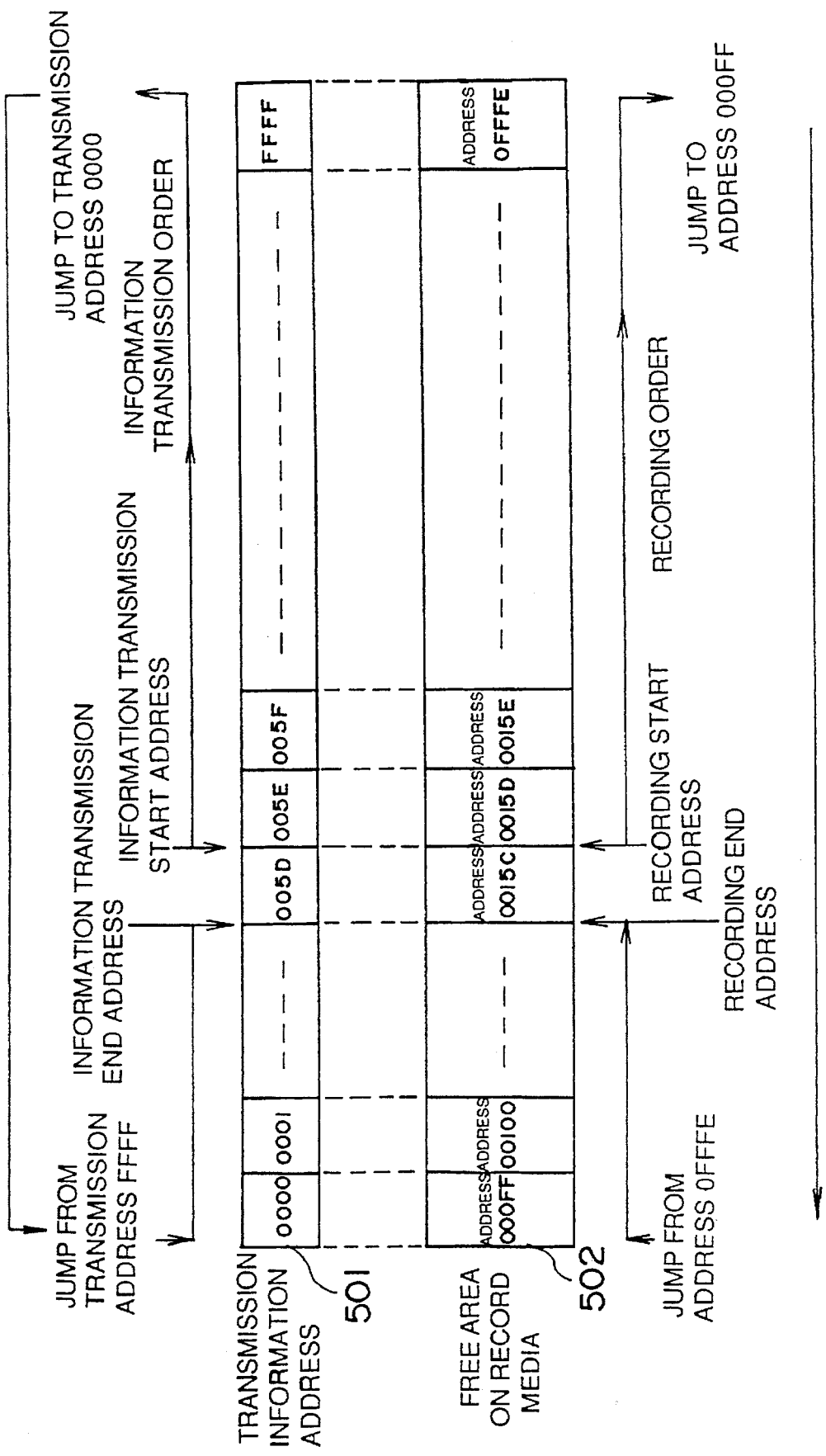
FIG. 5 is an illustration of the information reception apparatus of the invention in FIG. 4.

FIG. 5 shows the order of block addresses generated by the address generator 28. For example, when the information whose transmission is requested is information A discussed above, the transmission information amount is 268,000,000×16 bits and the information is transmitted as block information divided into 65,536 blocks having block addresses 0000 to FFFF (hexadecimal representation). At this time, assume that the information is transmitted starting at block address 005E (hexadecimal representation). Also, assume that the start address information of the free area on the magneto-optic media 41 where the information can be recorded indicates 000FF (hexadecimal representation).

From the top block address 005E (hexadecimal representation) and the start address 000FF (hexadecimal representation) on the magneto-optic media 41 where the information can be recorded, the address generator 28 generates record start address 0015D (hexadecimal representation) which is the 005Eth address counted from address 000FF for recording the received information on the magneto-optic media 41, and generates subsequent addresses up to record address 0FFFE (hexadecimal representation) on the magneto-optic media corresponding to block address FFFF (hexadecimal representation) in sequence. After this, the information at block addresses 0000 (hexadecimal representation) to 005D (hexadecimal representation) is received. Then, the address generator 28 generates record addresses 000FF (hexadecimal representation) to 0015C (hexadecimal representation) on the magneto-optic media accordingly. Therefore, the information is recorded on the magneto-optic media in the order as shown in FIG. 5 based on the output of the address generator.

The optical pickup controller 27 operates according to the addresses generated by the address generator 28 for moving the optical pickup 43 to the record locations of the magneto-optic media 41. In addition, the optical pickup controller 27 is controlled as instructed from the record controller 36 for setting a semiconductor laser of the optical pickup 43 into oscillation.

On the other hand, the information 208 separated from the received information by the received information reproducer 29 is input to the record data generator 32, and a modulation magnetic field is generated, in response to the information 208, by means of the magnetic head 26. The magnetic head controller 46 operates according to the addresses generated by the address generator 28 to move the magnetic head 26 to the record locations of the magneto-optic media 41, as with the optical pickup 43.

The information 208 is recorded on the magneto-optic media 41 by heating on the magneto-optic media 41 by semiconductor laser oscillation of the optical pickup 43 and a modulation magnetic field generated by the magnetic head 26. Thus, the information 208 transmitted from the information transmission apparatus in response to the data transmission request is recorded on the optical disk.

The record controller 36 compares the stored top block address 207 with each block address sent in sequence, and when the block address matches the block address just before the top block address 207, judges that all the information has been received from the information transmission apparatus as requested, and stops the recording operation. The comparison result between the information amount recorded on the record media and the transmission information amount 204 stored in the record controller 36 may be added to the judgment of the data reception completion. Further, the record controller 36 informs the information transmitting party of the information reception completion via the data transmission request signal generator 31. In this case, the reception termination bit 804 in FIG. 8 is set and sent to the information transmitting party. When receiving the information reception completion information, the information transmitting party operates so as to terminate the information transmission.

As described above, the invention is characterized by the fact that a record area is reserved in the information reception apparatus based on the transmission information data such as the transmission information amount 204 transferred at the beginning of information transmission, and then the block addresses transmitted with the information 208 by the information transmission apparatus are used to record the information 208 in order starting at an intermediate point in the record area.

In the embodiment, the information recorder using the magneto-optic record media is used as an example in the description, but it is also applicable to any other recorder such as a magnetic tape recorder, a semiconductor memory, or a hard disk unit.

The information recording method and apparatus and the information transmission method and apparatus can make up an information transmission/reception system. Thus, at the receiving party, the time required from issuing an information transmission request to completion of information reception depends on the information transmission amount and does not depend on the number of machines making information transmission requests. Therefore, the system of the invention is characterized by the fact that if the user waits for a given time determined by the transmission information amount, he or she can be assured of receiving the requested information, and can enjoy remarkably improved operability.

Next, a second embodiment of a data transmission apparatus will be discussed with reference to a block diagram shown in FIG. 6. Components identical with those previously described with reference to FIG. 1 are denoted by the same reference numerals in FIG. 6 and will not be discussed again. In the first embodiment shown in FIG. 1, the transmission start data generator 10, which generates the transmission start signal and transmission information data 210, etc., added when information, is transmitted is shared by the information and data insertion and gate circuits 11 to 13. However, in the second embodiment shown in FIG. 6, transmission start data generators 47, 48, and 49 are provided for each of information and data insertion and gate circuits 11, 12, and 13 respectively.

Figure 6:
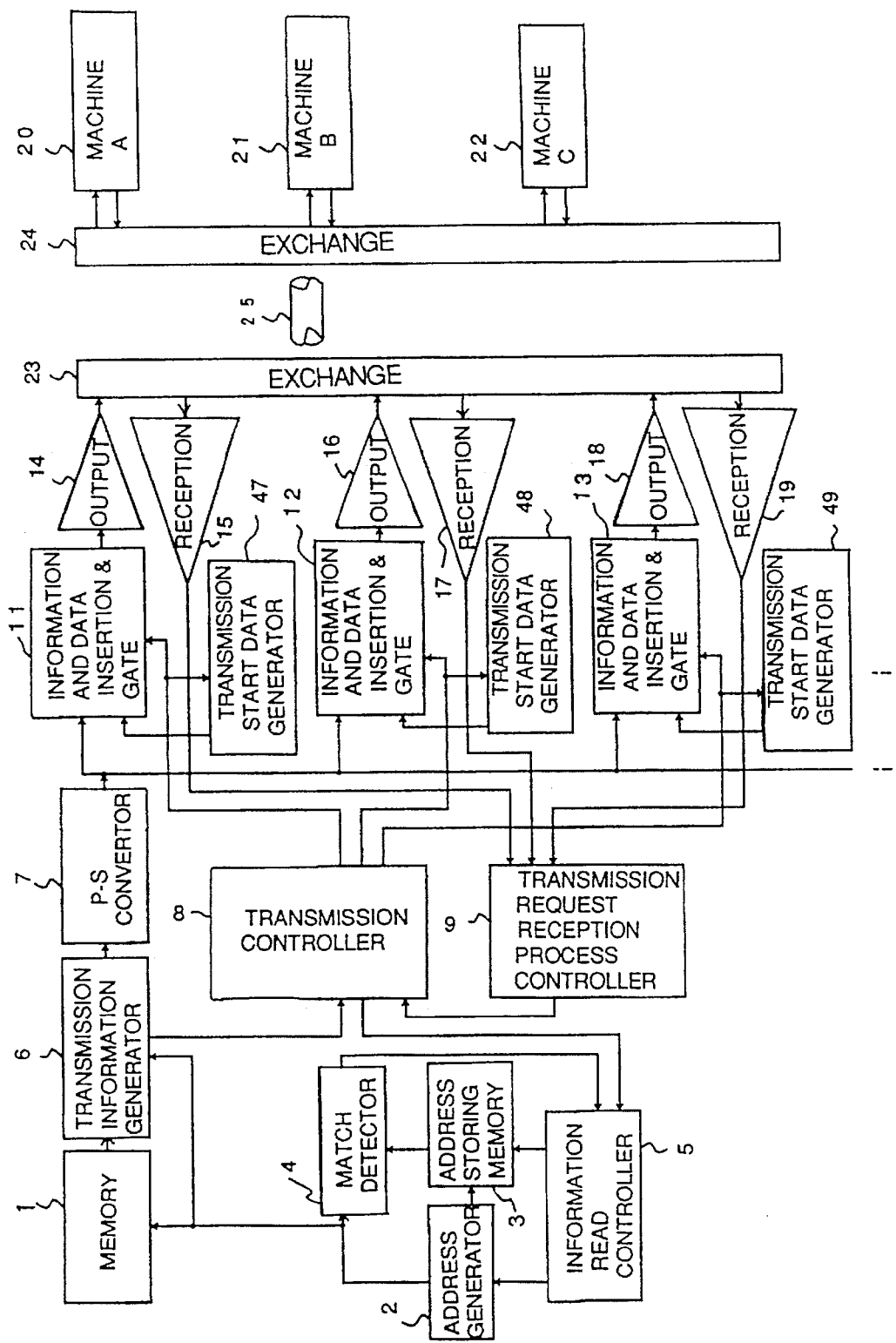
FIG. 6 is a block diagram of a second embodiment of an information, transmission apparatus of the invention.

In FIG. 6, numerals 47 to 49 are transmission start data generators, each of which generates the transmission start signal and transmission information data 210 added when information is transmitted in response to a data transmission signal received from a transmission controller 8.

The information transmission apparatus of the second embodiment can resolve queuing of requests for generating the transmission start signal and transmission information data 210, etc., added when information is transmitted when information transmission requests are received from external machines at the same time, if the transmission apparatus is a large-scaled one or when the information transmission capability to external machines is enhanced, that is, when information and data insertion and gate circuits and output circuits for transmitting information are increased. If a memory 1 stores information having different titles, for example, it stores movie information A, movie information B, and movie information C, the transmission start data generators can be set corresponding to the stored information entries. For example, the transmission start data corresponding to movie information A can be generated by the transmission start data generator 47, the data corresponding to movie information B by the transmission start data generator 48, and the data corresponding to movie information C by the transmission start data generator 49. Thus, to change some of the transmission information, for example, to change movie information B to movie information D, it can be executed without affecting offer data transmission circuits. In this case, as many address storing memories as the number of titles of stored information are required, and a plurality of read circuits for the memory 1 can also be provided.

Next, a third embodiment of data transmission apparatus will be discussed with reference to a block diagram shown in FIG. 7. Components identical with those previously described with reference to FIG. 1 are denoted by the same reference numerals in FIG. 7 and will not be discussed again.

Figure 7:
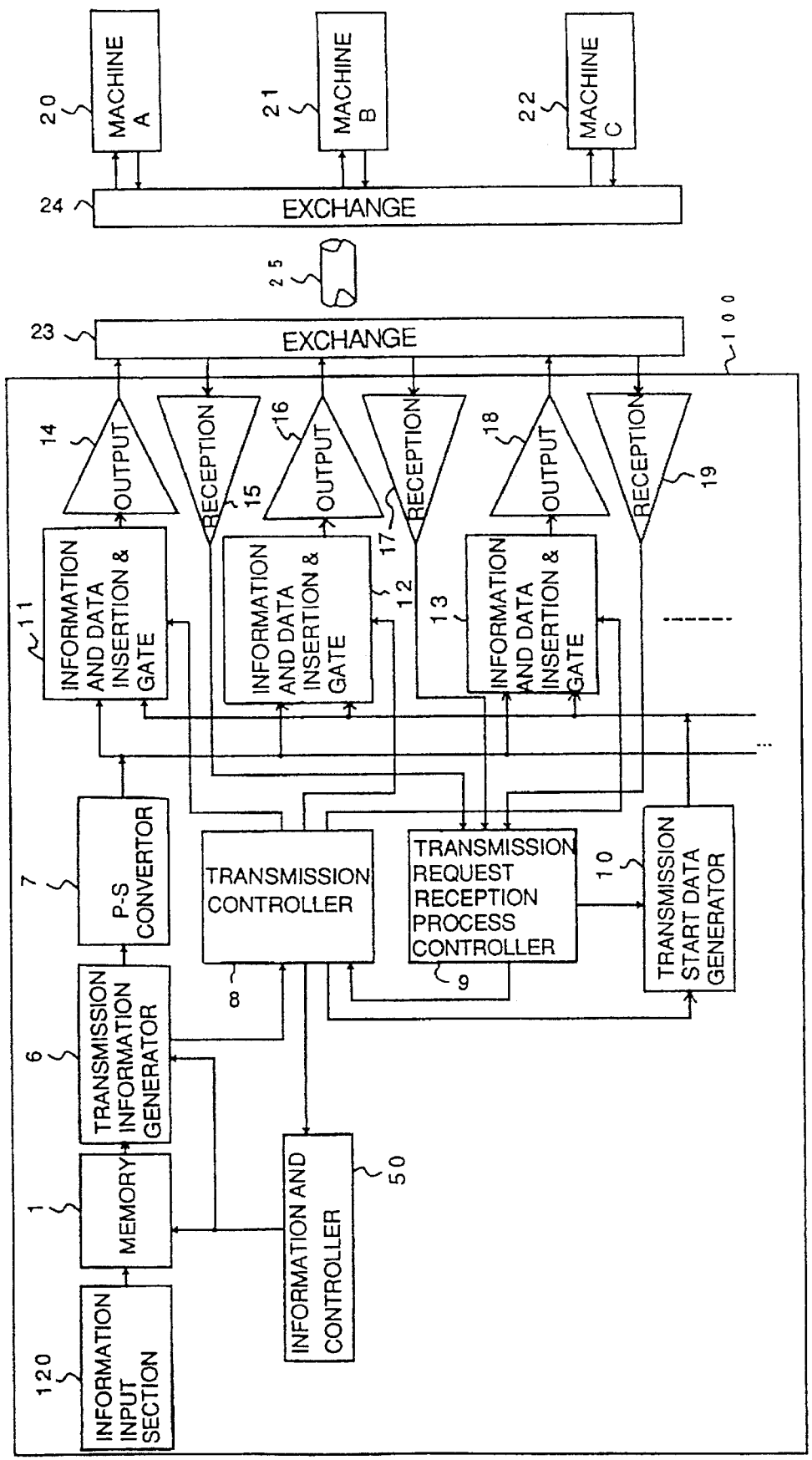
FIG. 7 is a block diagram of a third embodiment of an information transmission apparatus of the invention.

In FIG. 7, numeral 50 is a memory read controller which has a function of counting a given time corresponding to the information read time from the memory 1—depending on the information amount of the information to be read— based on the address generation operation for reading the information from the memory 1, and an information transmission request output signal from a transmission controller 8, and has a function of controlling stopping of the address generation operation by the count operation. In the first embodiment, when receiving a control signal from the transmission controller 8, the information read controller 5 controls storing of the address information generated by the address generator 2 in the address storing memory 3 for rewriting the current address information into the address storing memory 3. Then, the match detector 4 compares the address stored in the address storing memory 3 with each address generated by the address generator 2. When they match, the match detector 4 outputs a match signal to the information read controller 5, which then outputs a control signal for stopping the operation of the address generator 2. In the third embodiment shown in FIG. 7, the memory read controller 50 counts a given time corresponding to the information read time from the memory 1 based on the address generation operation for reading the information from the memory 1 and an information transmission request output signal from the transmission controller 8, and controls stopping of the address generation operation by the count operation. This configuration eliminates the need for the address storing memory 3 and the match detector 4 in the preceding embodiments.

As described above, the information reception method and apparatus and the information transmission method and apparatus of the invention can provide an information transmission/reception system. If information transmission requests are received from a number of machines at substantially the same time, the time required for completion of information reception at each machine depends on the information transmission amount. Conventional serial operation in which information is transmitted to the machines in sequence would mean that each external machine (the user of the external machine) has to wait for the time interval between the instant at which an information transmission request is issued and the instant at which information transmission is started. The wait time depends on the number of machines requesting information transmission, thus the time interval becomes nonscheduled. In contrast, the information transmission/reception system of the invention can complete the data reception at each reception machine for a given time independently of the number of reception machines issuing transmission requests. Therefore, if the user waits for a given time determined by the transmission information amount, he or she can be assured of receiving the requested information, and can enjoy remarkably improved operability.

According to the invention, there can be provided an information transmission/reception system which can receive a plurality of transmission requests and transmit information to the requesters so that it can be recorded in the requesting devices. There can also be provided an information transmission apparatus and information reception apparatuses in the information transmission/reception system.

What is claimed is:

1. An information transmission/reception system including an information transmission apparatus for transmitting information, and a plurality of information reception apparatuses for receiving said information, each of said information transmission apparatuses comprising:

a record media for recording the information;

a read means for reading the information recorded on said record media;

an address management means for specifying addresses of the information to be read by said read means;

a plurality of reception means for receiving requests for transmission of the information recorded on said record media;

a generation means for generating transmission information by adding address information corresponding to the address specified by said address management means to the information read from said record media by said read means;

a plurality of transmission means for sequentially transmitting the transmission information to which the address information is added by said generation means; and, a control means for controlling transmission of the information from said plurality of transmission means in accordance with reception of transmission requests at each of said plurality of reception means;

each of said plurality of information reception apparatuses comprising:

a transmission means for transmitting a request for transmitting the information recorded on said record media to said information transmission apparatus;

a reception means for receiving said transmission means of said information transmission apparatus;

a record media for recording said transmission information received at said reception means of said information reception apparatus; and, registering means for registering said transmission information received at said reception means of said information reception apparatus on said record media of the reception apparatuses based on the address information added to said transmission information;

wherein said address management means comprises:

an address generation means for sequentially generating the addresses in such a manner that the address generating means sequentially generates from a top address to an end address of the information and then returns to the top address for again generating the addresses sequentially until an instruction for terminating the specification of the addresses is issued;

a register which, while the information is being transmitted to a first one of said information reception apparatuses through the first transmission means of said plurality of transmission means, upon receipt of a request to transmit the same information from a second one of said information reception apparatuses, holds a transmission start address of the information transmitted to the second information reception apparatus; and, a comparison means for comparing each address of the information read by said read means with the address held in said register for detecting a match therebetween;

wherein while the information is being transmitted to the first information reception apparatus through the first transmission means, upon receipt of a request to transmit the same information from the second information reception apparatus, said control means of said information transmission apparatus controls the second transmission means so as to transmit the information to the second information reception apparatus starting at a current point at which the information is being transmitted to the first information reception apparatus through the first transmission means, and when said comparison means detects a match between the addresses, said control means instructs said address generation means to terminate the generation of the address, for terminating the transmission of the information to the second information reception apparatus.

2. An information transmission/reception system including an information transmission apparatus for transmitting information, and a plurality of information reception apparatuses for receiving said information, said information transmission apparatus comprising:

a record media for recording the information;

a read means for reading the information recorded on said record media;

an address management means for specifying addresses of the information to be read by said read means;

a plurality of reception means for receiving requests for transmission of the information recorded on said record media;

a generation means for generating transmission information by adding address information corresponding to the address specified by said address management means to the information read from said record media by said read means;

a plurality of transmission means for sequentially transmitting the transmission information to which the address information is added by said generation means; and, a control means for controlling transmission of the information from said plurality of transmission means in accordance with reception of transmission requests at each of said plurality of reception means and for issuing an instruction for terminating the specification of the addresses of the information;

each of said plurality of information reception apparatuses comprising:

a transmission means for transmitting a request for transmitting the information recorded on said record media to said information transmission apparatus;

a reception means for receiving said transmission information transmitted from said transmission means of said information transmission apparatus;

a record media for recording said transmission information received at said reception means of said information reception apparatus; and, a registering means for registering said transmission information received at said reception means of said information reception apparatus, at addresses indicated by the address information added to said transmission information, on said record media of the information reception apparatuses;

wherein said address management means comprises address generation means for generating the addresses in such a manner that the address management means sequentially generates from a top address to an end address of the information and then returns to the top address for again generating the addresses sequentially until the instruction for terminating the specification of the addresses is issued.

3. The information transmission/reception system as claimed in claim 2 wherein said information reception apparatus has a detection means for detecting the reception termination of the information based on the address information, wherein said transmission means of said information reception apparatus sends a notification of the information reception termination to said information transmission apparatus, upon detection of the reception termination of the information, and wherein said control means of said information transmission apparatus terminates transmission of the information upon receipt of the notification of the information reception termination from said transmission means of said information reception apparatus.

4. The information transmission/reception system as claimed in claim 3 wherein said generation means holds a total information amount of information read by said read means and outputs the held total information amount as transmission information data, and wherein said detection means of said information reception apparatus detects the reception termination of the information based on the total information amount instead of the address information.

5. The information transmission/reception system as claimed in claim 2 wherein said generation means divides information read by said read means into blocks of a predetermined length and adds a block address to each information block as address information.

6. The information transmission/reception system as claimed in claim 2 wherein said information transmission apparatus further includes a plurality of transmission information data generation means each for generating at least one entry of predetermined identification information of said information transmission apparatus, an information name and information amount of information read by said read means, and a synchronous signal as transmission information data, said plurality of transmission information data generation means corresponding to said plurality of transmission means on a one-to-one basis.

7. An information transmission apparatus comprising:

a record media for recording information;

a read means for sequentially reading the information recorded on said record media;

an address management means for specifying addresses of the information read by said read means;

a plurality of reception means for receiving requests for transmission of the information recorded on said record media;

a generation means for generating transmission information by adding address information corresponding to the addresses managed by said address management means to the information read by said read means from said record media;

a plurality of transmission means for sequentially transmitting the transmission information to which the address information is added by said generation means; and, a control means for controlling transmission of the information from said plurality of transmission means in accordance with reception of transmission requests at said plurality of reception means and for issuing an instruction for terminating specification of the address of the information;

wherein said address management means comprises an address generation means for generating the addresses in such a manner that the address management means sequentially generates from a top address to an end address of the information and then returns to the top address for again generating the address sequentially until the instruction for terminating the generation of the addresses is issued.

8. An information transmission apparatus comprising:

a record media for recording information;

a read means for sequentially reading the information recorded on said record media;

an address management means for specifying addresses of the information read by said read means;

a plurality of reception means for receiving transmission requests for transmission of the information recorded on said record media;

a generation means for generating transmission information by adding address information corresponding to the addresses managed by said address management means to the information read by said read means from said record media;

a plurality of transmission means for sequentially transmitting the transmission information to which the address information is added by said generation means; and a control means for controlling transmission of the information from said plurality of transmission means in accordance with reception of the transmission requests at said plurality of reception means;

wherein said address management means comprises:

an address generation means for sequentially generating the addresses in such a manner that the address generation means sequentially generates from a top address to an end address of the information and then returns to the top address for again generating the addresses sequentially until an instruction for terminating the specification of the addresses is issued;

a register which, while the information is being transmitted through a first transmission means of said plurality of transmission means, upon reception of a request to transmit the same information, holds a transmission start address of the information transmitted through a second transmission means of said plurality of transmission; and, a comparison means for comparing each address of the information read by said read means with the transmission start address held in said register for detecting a match therebetween;

wherein while the information is being transmitted through the first transmission means, upon receipt of a request to transmit the same information, said control means controls the second transmission means for transmitting the information starting at a current point in the information being transmitted through the first transmission means, and when said comparison means detects a match between the addresses, said control means instructs said address generation means to terminate generation of the address for terminating the transmission of the information through said second transmission means.

9. The information transmission apparatus as claimed in claim 8 wherein said control means, upon receipt of a notification of the information reception termination from a receiving party, terminates transmission of the information.

10. The information transmission apparatus as claimed in claim 8 wherein said generation means divides information read by said read means into blocks of a predetermined length and adds a block address to each information block as address information.

11. The information transmission apparatus as claimed in 8 wherein said generation means holds a total information amount of information read by said read means and outputs the held total information amount as transmission information data.

12. The information transmission apparatus as claimed in claim 8 further including a plurality of transmission information data generation means each for generating at least one entry of predetermined identification information of said information transmission apparatus, an information name and information amount of information read by said read means, and a synchronous signal as transmission information data, said plurality of transmission information data generation means corresponding to said plurality of transmission means on a one-to-one basis.

13. In an information transmission apparatus which has record media for recording information, accepts an information transmission request, and sends information, a method of transmitting information comprising the steps of:

accepting a first request to transmit the information;

reading the information from said record media in an address order;

generating transmission information by adding address information corresponding to addresses of the read information to the read information;

transmitting the transmission information which has been added to the address information, to the first information transmission requester;

transmitting the information to the second transmission requester starting at the current address of the information being transmitted to the first transmission requester upon acceptance of a second request to transmit the same information while the information is being transmitted;

returning to a top address after transmitting the information up to an end address of the information; and continuing the transmission of the information.

14. The method as claimed in claim 13 further including the steps of:

holding a transmission start address of the information transmitted to the second transmission requester while the information is being transmitted to the first transmission requester, upon acceptance of a second request to transmit the same information;

comparing each address of the information read from said record media with the held address for detecting a match therebetween; and terminating the information transmission to the second requester upon determination of a match between the addresses.

15. The method as claimed in claim 13 further including the steps of:

dividing the information read from said record media into blocks of a predetermined length; and adding a block address to each divided information block, as the address information.

16. The method as claimed in claim 13 wherein when information is transmitted to a transmission requester, a total information amount of the information is further transmitted to the transmission requester.

* * * * *